UNITED STATES PATENT OFFICE.

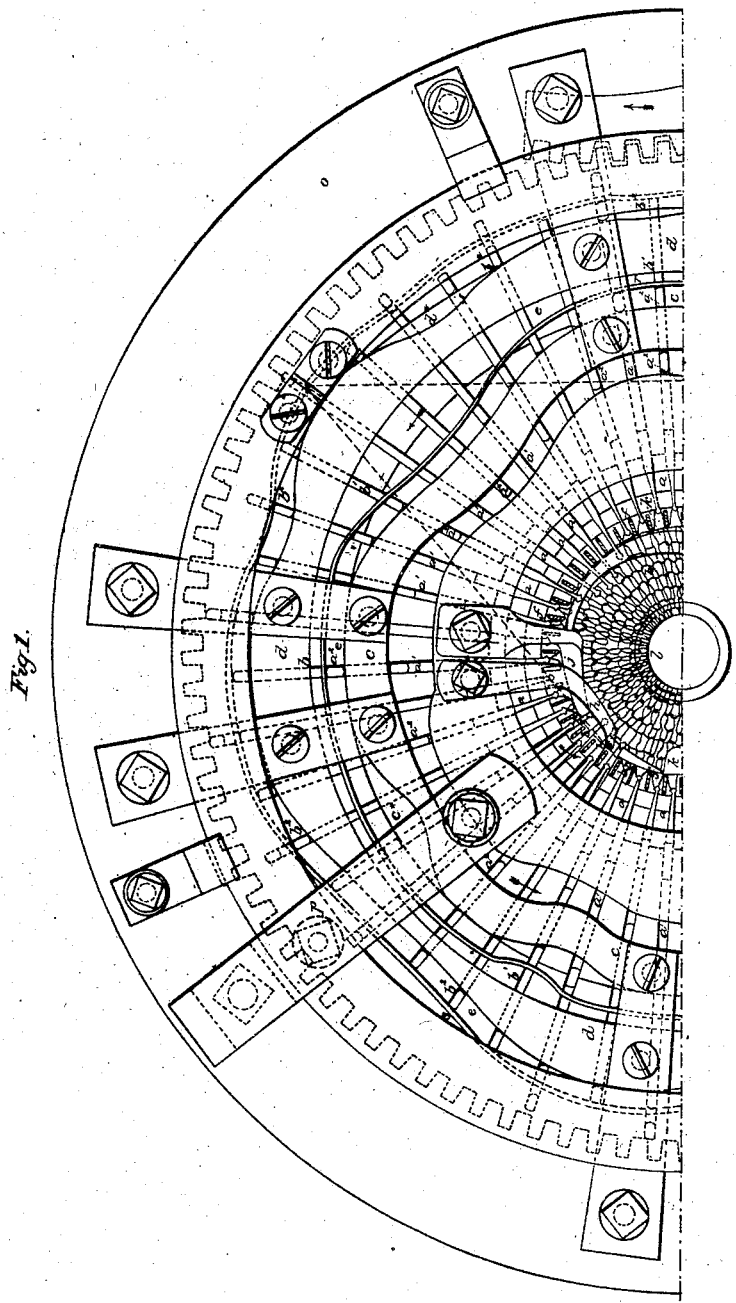

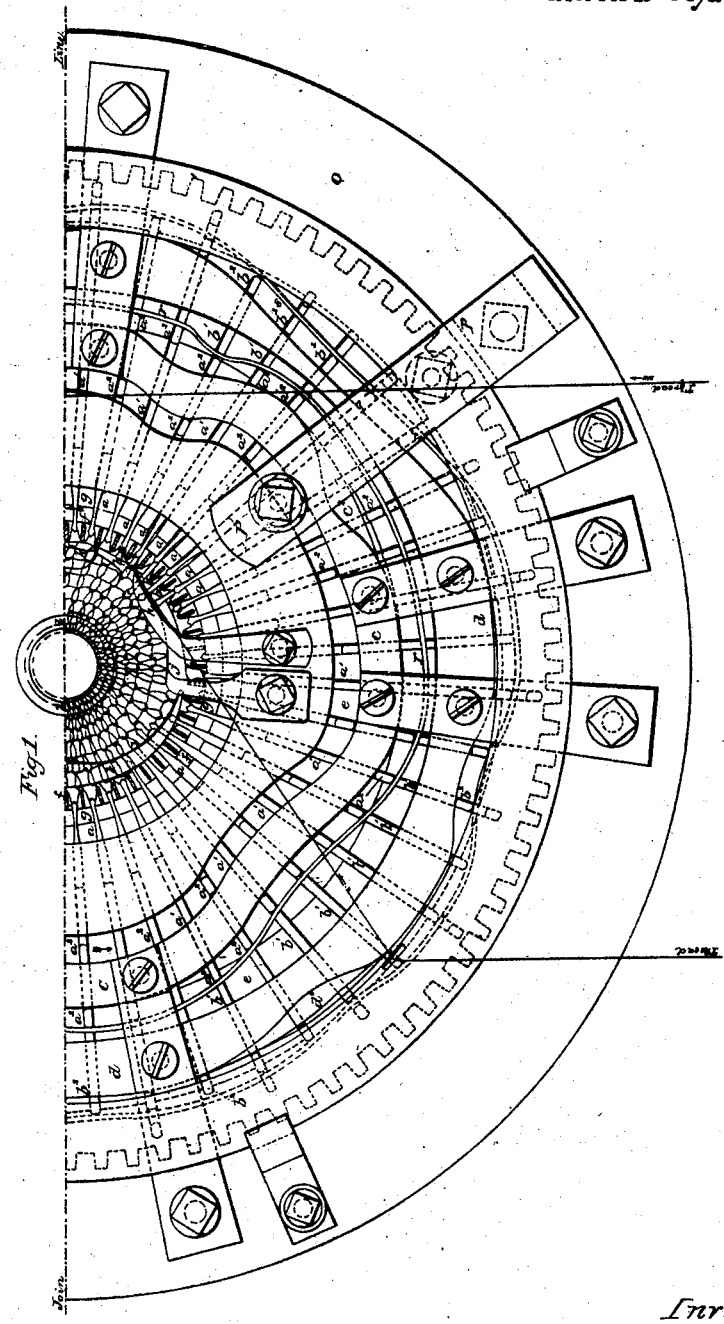

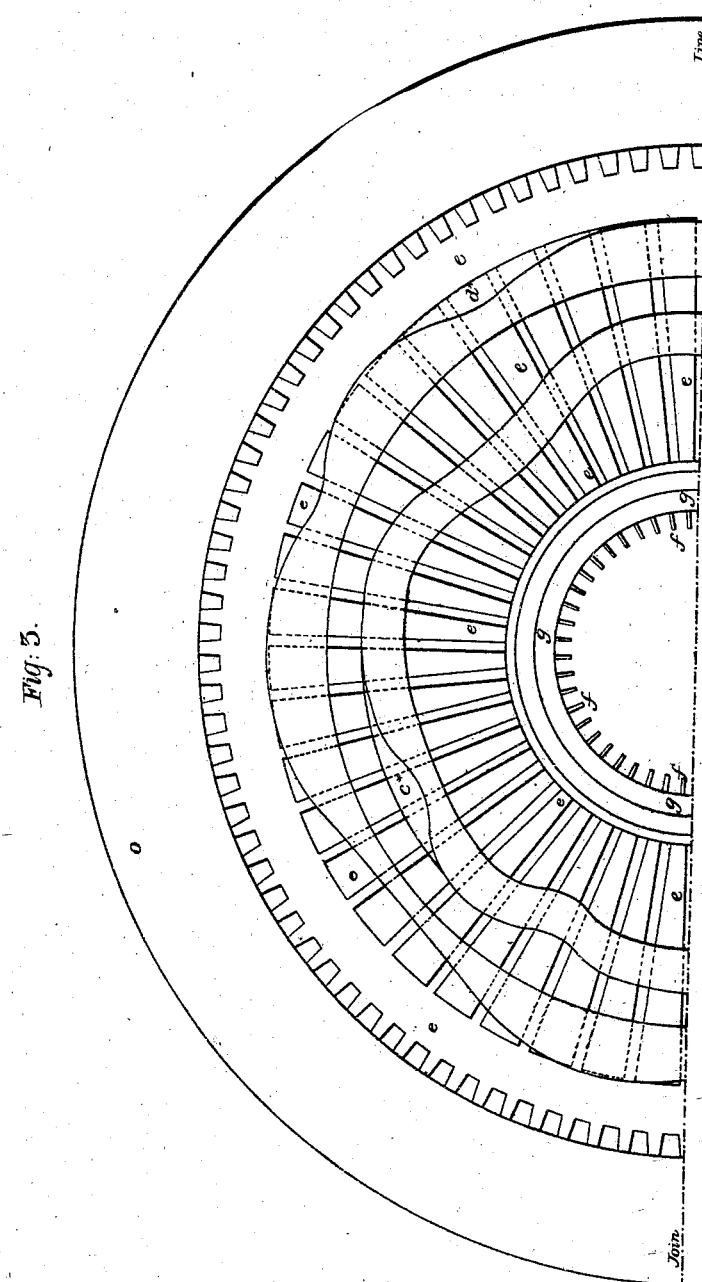

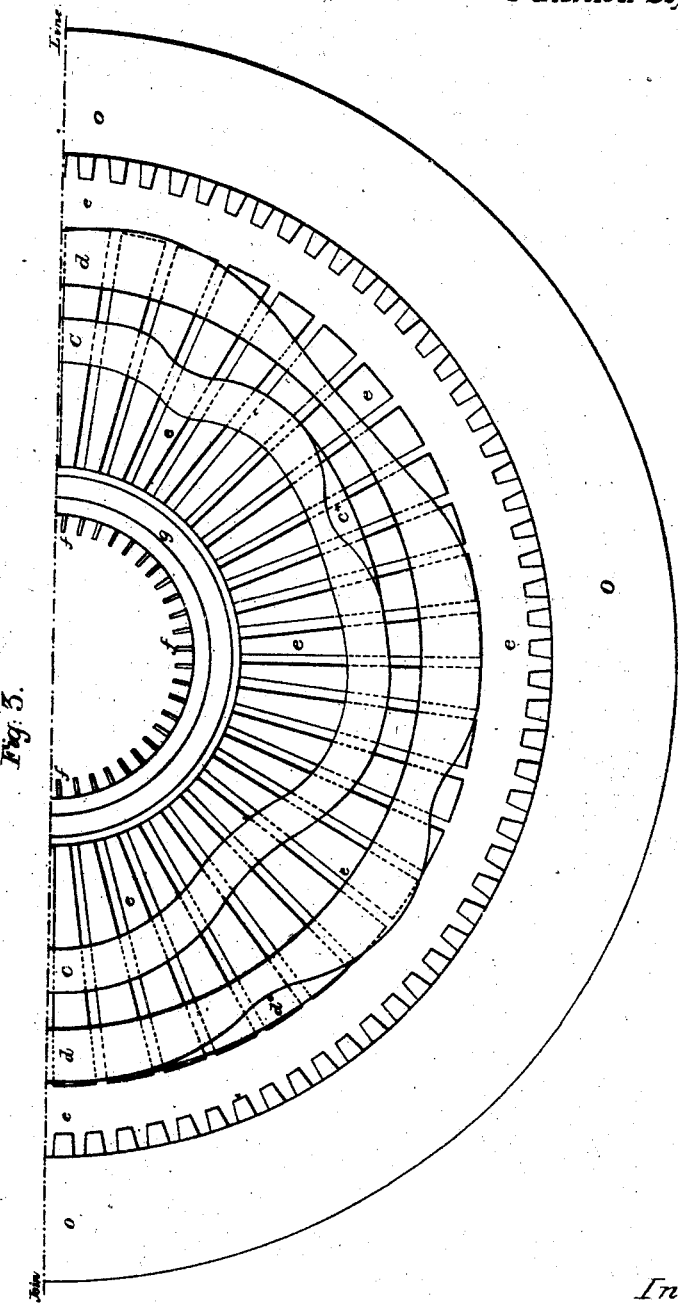

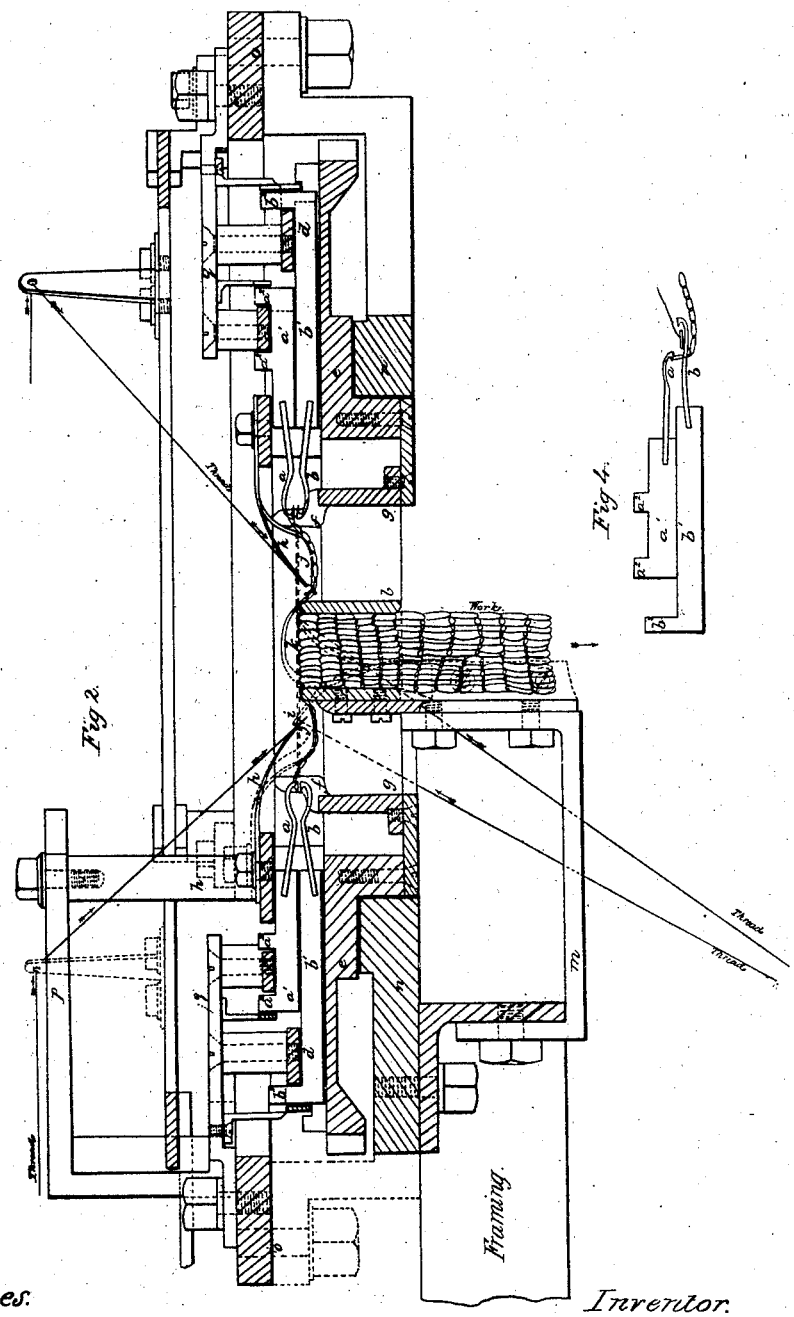

JOHN THORNTON, JAMES THORNTON, AND WILLIAM THORNTON, OF NOTTINGHAM, ENGLAND, ASSIGNORS TO MARTIN LANDENBERGER, OF PHILADELPHIA, PENNSYLVANIA.

IMPROVEMENT IN KNITTING-MACHINES.

Specification forming part of Letters Patent No. 44,494, dated September 27, 1864.

*To all whom it may concern:*

Be it known that we, JOHN THORNTON, JAMES THORNTON, and WILLIAM THORNTON, all of Nottingham, England, manufacturers, subjects of the Queen of Great Britain, have invented or discovered, conjointly with ALBERT THORNTON, since deceased, new and useful Improvements in an Apparatus Used for Producing Looped Fabrics; and we, the said JOHN THORNTON, JAMES THORNTON, and WILLIAM THORNTON, do hereby declare the nature of the invention, for and in what manner the same is to be performed, to be particularly described and ascertained in and by the following statement thereof—that is to say:

This invention has for its object improvements in apparatus used for producing looped fabrics. For these purposes two sets of hooks or looping-instruments are used, and it is preferred that each hook should be of a triangular shape—that is, that the point of the hook should be sharp and then widen out till it joins its stem. The hooks of the two sets are set toward or facing each other, and so that they nearly touch as they slide to and fro. The hooks are carried by sliding bolts. It is preferred that the machine should be circular, and that the bolts carrying the hooks should be arranged to slide to and from the center of the circle. The two sets of hooks may be arranged to revolve about a vertical or horizontal axis. When the machine revolves about a vertical central axis, the two sets of hooks will be in two horizontal parallel planes very near together, and the two hooks of each pair will be arranged one under the other. It is preferred that the two sets of hooks should rotate together, while the thread-carriers or instruments which supply the threads (placed at intervals around the circle) should be stationary. The thread-carriers or instruments are different for the two sets of hooks. The sliding of the bolts of the hooks is by cams or suitable surfaces, which, when the two sets of hooks are caused to rotate, are stationary. The sliding bolts of the hooks are all independent, so that the bolts of each pair of hooks can be slid to and fro independently of each other, and there is a separate set of cam-surfaces for each set of hooks. The sinkers or blades between which both sets of hooks work rotate with the hooks. In the center of the machine is a tubular passage, through which the work as it is produced is drawn. Near the sinkers there are inclines or fixed brackets, which are so formed that the work, in passing from the hooks to the tubular passage, is bent out of a straight line by parts of the inclines, and is then allowed, by other parts of the inclines, to come more and more toward a straight line between the end of the tubular passage and the hooks. There are four such brackets and inclines used, and four thread-carriers or instruments for supplying threads to the hooks; but this may be varied. In working, the loops produced by one set of hooks are constantly drawn through the loops produced by the other set of hooks.

And in order that our said invention may be most fully understood and readily carried into effect, we will proceed to describe the drawings hereunto annexed, which represent a circular machine, to be operated with the plane of the circle in a vertical position.

In the drawings, Figure 1 is a front view, or it may be a plan, in case the machine be set horizontally, and Fig. 2 is a transverse section, of a machine or apparatus for producing looped fabrics, arranged according to our invention.

*a a* and *b b* are two sets of hooks or looping-instruments, placed face to face and close, the one to the other. The form of one of these hooks or instruments is clearly shown at Figs. 1 and 4. The hooks *a* and *b* are fixed on slides or bolts $a'$ $a'$ $b'$ $b'$, and these have projections $a^2$ $a^2$ $b^2$ $b^2$ upon them for the stationary cams *c* and *d* to act upon. The slides or bolts $a'$ $b'$ work in radial grooves cut or formed in the revolving plate *e*. These grooves are more clearly seen in Fig. 3, which is a view similar to Fig. 1, but with the working and some other parts removed.

*f f* are blades or sinkers, arranged round in a circle, and having the hooks or looping-instruments between them. The sinkers *f* are fixed in a holding-ring, *g*, screwed to the plate *e*.

*h h* are the two thread carriers or guides at the front of the machine. They are stationary, and have eyes at their ends, through which the yarn to supply the machine is led. At the back of the machine, or on the other side of the hooks or looping-instruments, there are other similar thread-carriers, $i\ i$.

$j\ j$ are fixed inclines at the front of the machine, and which are employed to press the work toward the back at the points required, and $k\ k$ are other similar inclines at the back of the machine, employed to press the work toward the front.

$l\ l$ is a tube through which the finished work is led away. It is screwed to a bracket, $m$, which is itself fixed to the stationary ring $n$, in which the ring $e$ revolves.

$o$ is also a fixed ring, and to it the brackets $p$, carrying the thread-carriers $h$, are attached. The cams $c$ and $d$ are also secured to the ring $o$. The back thread-carriers $i$ are supported by the bracket $m$.

The ring $e$ is made to rotate by means of spur-teeth on its periphery, as shown in Fig. 1, which gear with a s ur-wheel on the driving-axis. As the plate $e$ revolves, it will be seen that the hooks or looping-instruments are alternately drawn back and protruded by the action of cams $c$ and $d$. The front hooks or instruments, $a$, are worked by the cam $c$. The bolt $a'$ of every alternate hook or instrument $a$ has two projections, $a^2$, upon it, so that the cam moves them both to and fro. The other hooks or instruments $a$, for a purpose which we will presently explain, have only one projection, $a^2$, on its bolts $a'$; but these are kept up to the outer circumference of the cam $c$ by the guide-plate $r$; so that all the hooks or instruments $a$ make, usually, similar motions in working a course. The back hooks or instruments, $b$, are worked by the cam $d$. Their bolts $b'$ are, however, each made with but one projection, $b^2$, upon it on the outer side of the cam, and these are kept up to the cam by the guide-plate $s$.

In working a course the action of the parts is as follows: Suppose the work, in commencing, to be on the front hooks, then in working the course the work is first pressed back by one of the inclines $j$. This extends or opens the loop on the hook or instrument $a$, and the hook or instrument $h$ is thrown forward through the said loop. In this position, in which the parts are shown in the diagram, Fig. 4, the hooks pass under the eye of the thread-carrier. The hook $b$ then returns, and in returning catches the thread and draws a loop of it through the loop previously on the hook $a$. The said hook $a$ then immediately moves forward and throws off the old loop. For the next course, the work being in the hooks or instruments $b$, one of the back inclines, $k$, presses the work forward, and the hook or instrument $a$ is thrown forward through the loop. It receives thread from a back thread-carrier, as before, and retires, and the hooks $b$ move forward to throw off the old loop. Thus the work proceeds, the courses being worked alternately by the front and back hooks.

The object of making every alternate bolt different in some respects from their fellows is for the purpose of making tuck-work. To do this each alternate hook or instrument is made to discharge its loop just before commencing to work the course, and for this purpose they are made to receive a movement forward. This is done by taking removable pieces out of the cams $c$ and $d$ at the points $c^x$ and $d^x$, and other inclines, which we have not thought it necessary to show, are applied to cause the alternate bolts to follow into the indentations so produced, the projection $a^2$ and $b^2$ of each alternate bolt being lengthened so as to be caught by the additional inclines thus applied.

Having thus described the nature of our invention and the manner of performing the same, we would have it understood that we do not confine ourselves to exact details; but

What we claim is—

The arranging apparatus for producing looped fabrics as above described—that is to say, with two sets of hooks or looping-instruments facing each other and combined with other parts, as above described, so that in working the courses the fabric already made is transferred continually to and fro from one set of hooks to the other, the hooks or instruments which for the time are clear of the fabric being also passed through the loops in the corresponding hooks or instruments of the other set and in returning drawing back loops of thread through them, the course being completed by the hooks having the old loops throwing them off.

JOHN THORNTON.
JAMES THORNTON.
WILLIAM THORNTON.

*William Thornton, Sole Executor and Residuary Legatee of Albert Thornton, deceased.*

Witnesses:
 NOAH LEOPOLD,
  *Solicitor, Nottingham.*
 J. BLACK,
  *Attorney's Clerk, Nottingham.*
 JOHN THOMPSON BREWSTER,
  *Notary Public, Nottingham.*